United States Patent [19]

Sugimoto et al.

[11] Patent Number: 5,215,505
[45] Date of Patent: Jun. 1, 1993

[54] ENDLESS BELT FOR VARIABLE RATIO POWER TRANSMISSION

[75] Inventors: Yoshiaki Sugimoto, Tokorozawa; Toshihiro Hosokawa, Takatsuki; Hiroki Ishida, Tokorozawa; Nobuyuki Fujimoto, Hanno, all of Japan

[73] Assignee: Tsubakimoto Chain Co., Osaka, Japan

[21] Appl. No.: 911,976

[22] Filed: Jul. 10, 1992

[30] Foreign Application Priority Data

Jul. 12, 1991 [JP] Japan .............................. 3-62163[U]
Nov. 20, 1991 [JP] Japan ............................ 3-102798[U]

[51] Int. Cl.$^5$ .............................................. F16G 1/24
[52] U.S. Cl. ................................................ 474/242
[58] Field of Search ............... 474/206, 237, 240, 242, 474/201

[56] References Cited

U.S. PATENT DOCUMENTS 4,927,404 5/1990 Rattunde ............................ 474/242
4,938,737 7/1990 Yamamuro ......................... 474/242

FOREIGN PATENT DOCUMENTS 57-23820 5/1982 Japan .
316544 4/1989 Japan .

Primary Examiner—Thuy M. Bui
Attorney, Agent, or Firm—Howson & Howson

[57] ABSTRACT

An endless belt, for use in a variable speed transmission comprising at least one pulley having opposed conical surfaces, comprises a loop-shaped stack of I-shaped friction plates having left and right recesses, with chains located in the recesses in side-by-side relationship. Each chain comprises interleaved link plates, and the chains are out of phase with each other by one-half the pitch distance. Each friction plate is engaged, in driving relationship, in notches in the link plates of one of the two chains, and the next friction plate is engaged, in driving relationship, in notches of the link plates of the other chain. There are no friction plates which are not engaged in notches of the link plates. Consequently less pressure and improved friction are achieved. The preferred link plate comprises two separable layers formed by stamping. In one preferred embodiment, the chains comprise interleaved groups of link plates of uniform thickness, and each group consists of the same number of link plates.

3 Claims, 10 Drawing Sheets

ENDLESS BELT FOR VARIABLE RATIO POWER TRANSMISSION

Brief Summary of the Invention

This invention relates to power transmission, and more particularly to improvements in power transmissions of the type in which an endless belt is disposed in frictionally engaging relationship with surfaces of at least two pulleys, and in which the relationship between the belt and the pulley surfaces can be adjusted to achieve a continuously variable drive ratio.

A typical endless belt of the type to which the invention relates is disclosed in Japanese laid-open patent application No. 316544/1989. This typical endless belt comprises a set of I-shaped friction plates stacked in a series in overlapping relationship with one another to provide a friction plate structure in the form of a closed loop. Each I-shaped friction plate has upper and lower bars defining recesses on its opposite sides. (The upper bars should be understood as the bars positioned toward the outside of the loop of the drive belt and the lower bars are the bars positioned toward the inside of the loop.) By reason of the I-shaped configuration of each of the stacked plates, the friction plate structure has recesses on its opposite sides for receiving respectively left and right endless chains, which are engaged in driving relationship with the friction plate structure. Each chain comprises interleaved link plates disposed at a uniform pitch distance, and the pitch distance for the left chain is the same as the pitch distance for the right chain. The left and right chains are disposed out of phase with each other by one half the pitch distance.

The outer edges of the lower bar of each friction plate are tapered so that they conform to the opposed conical surfaces of V-shaped grooves in a pair of pulleys between which the belt extends. The tapered outer edges of the lower bars of the friction plates frictionally engage the conical surfaces of the V-shaped grooves in the pulleys so that power is transmitted from one pulley to the belt, and from the belt to the other pulley.

In a variable speed transmission, the conical surfaces of at least one pulley are provided on separate elements which are adjustable toward and away from each other. This allows the drive ratio between the pulley and the belt to be changed by varying the gap between opposed conical surfaces of the pulley. As the gap of one pulley is increased, the resulting increased slack in the belt is taken up either by decreasing the gap of the other pulley or by other take-up means. The use of the adjustable gap pulley makes the drive ratio of the power transmission continuously variable.

One problem encountered in power transmissions of the kind to which this invention relates is that the friction plates which are drivingly engaged with the left chain and the friction plates which are drivingly engaged with the right chain are separated by friction plates which are not drivingly engaged with either chain. So long as the radius of curvature of the inner peripheral surfaces of the links of the chains are equal to the radius of curvature of the lower bars of the friction plates, all of the friction plates share the forces exerted by the chains. However, in the operation of a variable speed transmission, conditions can be encountered in which these radii of curvature become unequal. For reasons which will be explained in detail below, if the radius of curvature of the inner peripheral surfaces of the links of the chain is either greater than or less than the radius of curvature of the lower bars of the friction plates, the friction plates which are not drivingly engaged with the chains do not share the forces. Consequently the other friction plates are subjected to greater forces, pressures exerted on friction surfaces are increased, and surface pressure fatigue is induced.

Another problem encountered in prior art power transmissions results from the fact the link plates of a chain, when engaged with a portion of the lower bar of a friction plate, are subjected to a load in the longitudinal direction of the chain, as a result of a moment generated in the friction plate by forces acting on the opposite end of the lower bar. The interleaved link plates, held together by each pin of a chain, consist of a group of n so-called "inner" link plates interleaved with n+1 so-called "outer" link plates. The width of the group of n inner link plates is less than the width of the group of n+1 outer link plates by twice the thickness of a link plate. Consequently, the inner link plates are subjected to a greater load. Furthermore, in the group of inner link plates, the plate closest to the center of the friction plate is subjected to the greatest load. Therefore the overall strength of the chain is determined by the strength of the inner link plate closest to the center of the friction plate. Localized loading of the chain also reduces the overall power transmission capability of the belt.

The principal object of this invention is to provide a simple belt structure for a power transmission in which all of the friction plates share the forces applied by the drive chains under varying conditions.

It is a further object of the invention to provide a more of the aforementioned problems of increased forces, increased pressures on friction surfaces, and surface pressure fatigue are either reduced or eliminated.

A still further object of the invention is to improve the power transmitting capabilities of the transmission incorporating the belt structure, by increasing the overall friction between the belt and the pulleys.

Still other objects of the invention are to increase the overall strength of the drive belt, to improve the power transmission capabilities of the belt by reducing localized loads, and to overcome the problems caused by moments resulting from the forces acting on the ends of the lower bars of the friction plates.

The invention addresses the problems encountered in the prior art as a result of differences in the radii of curvature of the inner peripheral surfaces of the chains and of the lower bars of the friction plates. These problems are overcome by eliminating the friction plates which are not drivingly engaged with the link plates so that the friction plates are constituted by only the friction plates which are drivingly engaged with the link plates. Therefore, even if the relationship between the radius of curvature of the inner peripheral surfaces of link plates and the radius of the lower bars of the friction plates changes, the forces exerted by the chains are shared by all the friction plates.

More specifically, the belt in accordance with the invention comprises: a plurality of friction plates, each friction plate having an I-shaped cross section, said plates being stacked in a series in overlapping relationship with one another to provide a friction plate structure in the form of a closed loop, said friction plate structure having recesses on opposite sides thereof; and first and second endless chains situated in side-by-side relationship to each other, located respectively in said recesses, and coupled to said friction plate structure in driving relationship therewith; in which each of said first and second chains comprises interleaved links disposed at a uniform pitch distance, the pitch distance for the second chain being the same as the pitch distance for the first chain; in which the second chain is disposed out of phase with the first chain by one half said pitch distance; in which the first chain is directly engaged with the plates a first subset of said plates; and in which the second chain is directly engaged with the plates of a second subset of said plates, said second subset consisting of all of the plates in said plurality of friction plates other than the plates of said first subset; whereby all of said plates are directly engaged with said endless chains.

A preferred embodiment of the invention also addresses the problems caused by moments resulting from the forces acting on the ends of the lower bars of the friction plates. These problems are overcome by providing chains in which both groups of interleaved link plates associated with each transverse pin have the same number of link plates.

More specifically, each of the first and second chains comprises transverse pin means and, on each transverse pin means, first and second groups of link plates are interleaved with each other, the first group being disposed longitudinally ahead of the second group by the pitch distance. In each of the chains, all of the link plates are of the same plate thickness. Furthermore, each of the first and second groups of link plates on each transverse pin means of each of the first and second chains consists of the same number of link plates as the number of link plates with which it is interleaved.

Further objects, details and advantages of the invention will be apparent from the following detailed description, when read in conjunction with the drawings.

DETAILED DESCRIPTION

Figure 8:
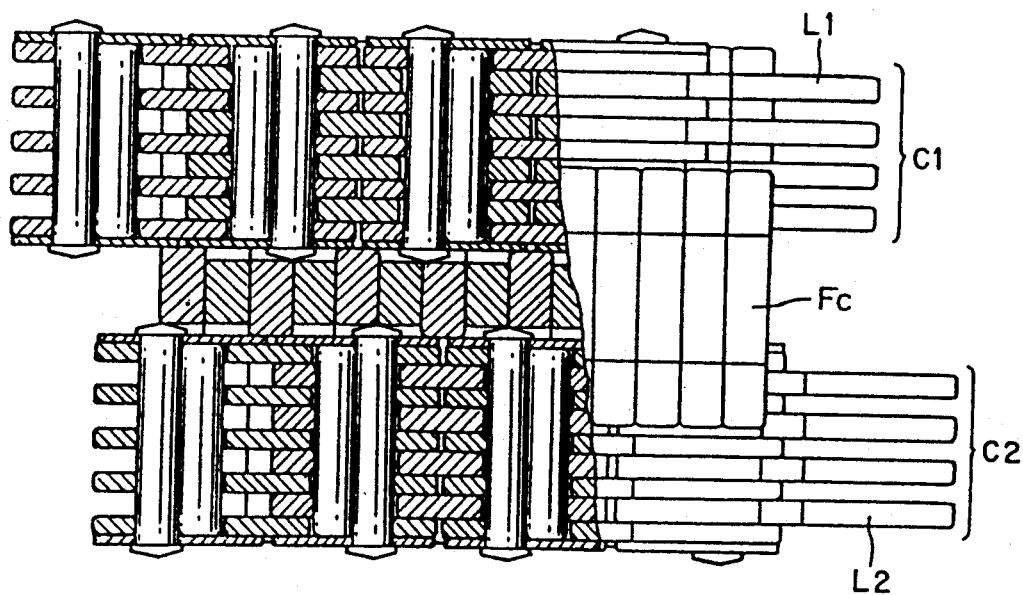
FIG. 8 is a top plan view, partly in section, of the drive belt of FIG. 7.

In FIG. 8, which shows a conventional power transmission belt in plan view, chains C1 and C2 are disposed respectively recesses provided in the opposite sides of a stack of I-shaped plates. Each chain comprises interleaved link plates held together by transverse pins. The two chains are disposed in side-by-side relationship to each other, but out of phase with each other by one-half the pitch distance, i.e. by one-half the distance through which any given link plate would need to be moved in order to be directly aside a link plate with which it is interleaved.

As shown in FIG. 8, link plate L1 of chain C1 is provided with a notch, or cut-out portion, A1 in the central part of its inner edge and a similar notch A1' in the central part of its outer edge. Each of the other link plates is provided with a pair of similar notches. Notch A1, and corresponding notches of the link plates located in side-by-side registry with link plate L1, receive the upper surface F1 of the lower bar of friction plate Fa. Similarly, notch A1', and corresponding notches in the adjacent link plates, receive lower surface F1' of the upper bar of friction plate Fa.

Figure 9:
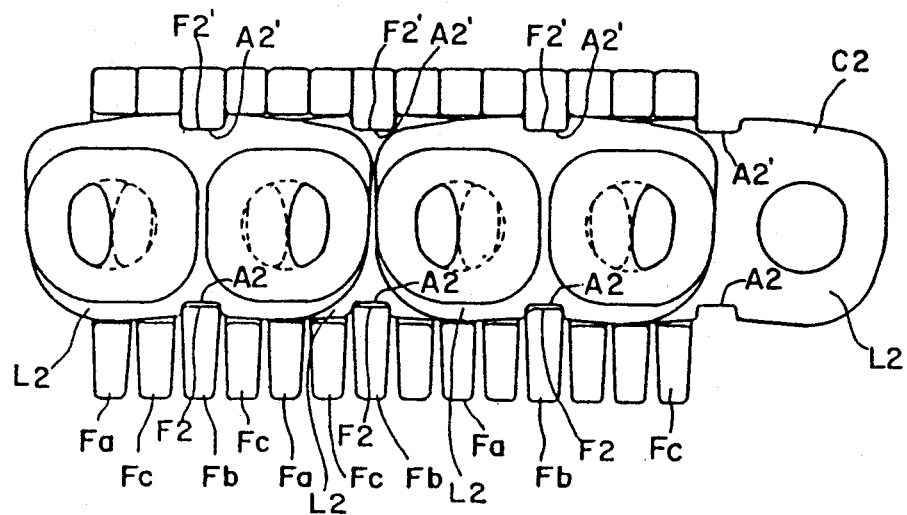
FIG. 9 is a front elevation of the drive belt of FIG. 7.

As shown in FIG. 9, chain C2 is provided with link plates L2, which have notches A2 and A2', in the central parts of their respective inner and outer edges, for receiving surfaces F2 and F2' of the lower and upper bars of friction plate Fb.

Between friction plates Fa and Fb, there are disposed friction plates Fc, which are not engaged with the link plates of either chain.

Figure 10:
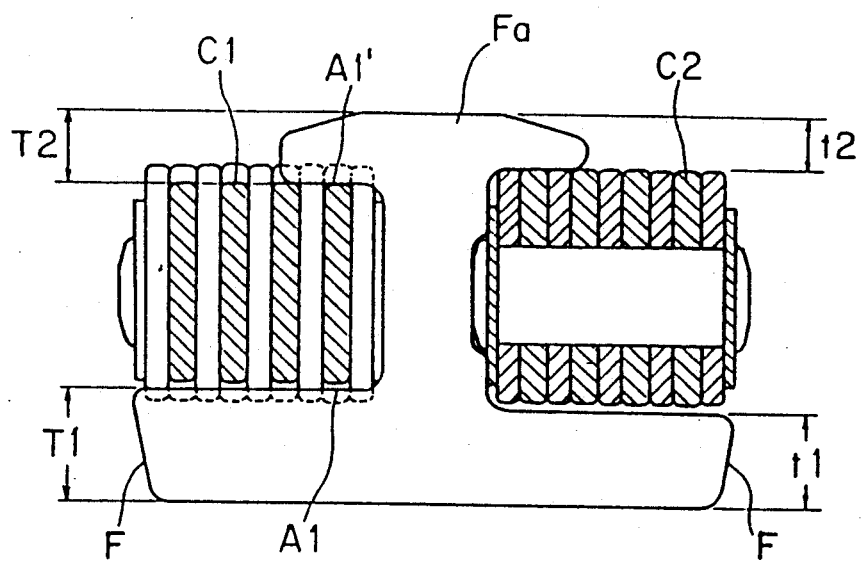
FIG. 10 is a transverse cross-section through the drive belt of FIG. 7, showing a friction plate which is drivingly engaged with one of the chains.

As shown in FIG. 10, the leftward projection parts of the lower and upper bars of friction plate Fa have heights T1 and T2 respectively, such that the bars enter notches A1 and A1' of the link plates of chain C1. The rightward projecting portions of the lower and upper bars have lesser heights, t1 and t2 respectively, so that they do not enter notches in the link plates of chain C2. Friction plates Fb are similar to friction plates Fa, but the configuration of plates Fb is a mirror image of the configuration of plates Fa as shown in FIG. 10. The parts of the upper and lower bars of friction plates Fb which form the upper and lower boundaries of the recess for receiving chain C2 have heights corresponding to T2 and T1, so that they engage with notches A2 and A2' of links L2. Thus, friction plates Fa engage notches in the links of chain C1 but do not engage with notches of the links of chain C2, and friction plates Fb engage notches in the links of chain C2, but do not engage with notches in the links of chain C1.

Figure 11:
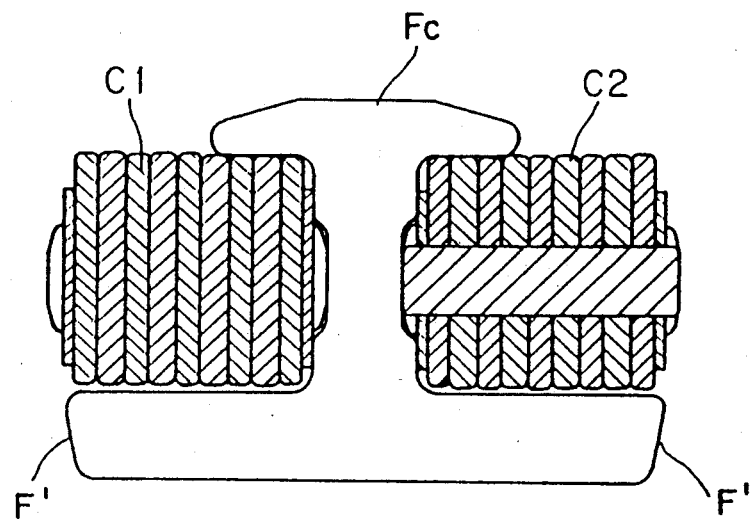
FIG. 11 is a transverse cross-section through another portion of the drive belt of FIG. 7, showing a friction plate which is not in direct driving relationship with either of the chains.

Friction plates Fc, as shown in FIG. 11, are formed so that the right and left portions of their upper bars are of equal height, and so that the right and left portions of their lower bars are similarly of equal height. Plates Fc do not engage notches in the links of either of chains C1 and C2.

Figure 7:
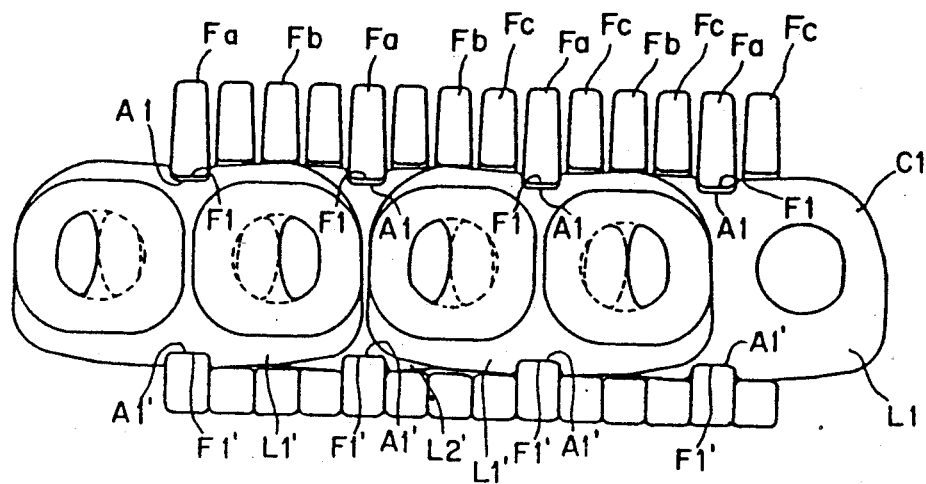
FIG. 7 is a rear elevational view of a conventional friction drive belt in accordance with the prior art.

As will be apparent from FIGS. 7-9, the friction plates Fc, which do not engage with link plates of either chain, are interposed between friction plates Fa, which engage with chain C1, and friction plates Fb, which engage with chain C2. The plates are arranged in the order Fa, Fc, Fb, Fc, Fa, Fc, etc.

When a belt embodying friction plates Fa, Fb and Fc, arranged in the above order, is engaged with V-type pulleys there are three possible conditions, as illustrated and explained below with reference to FIGS. 12 to 20.

Figure 12:
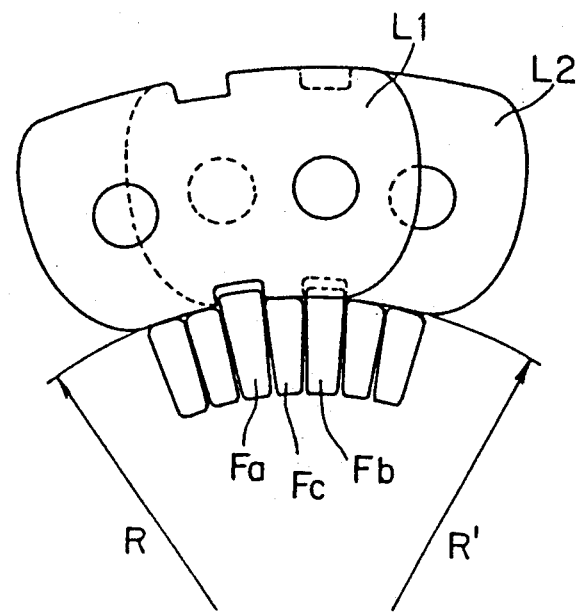
FIG. 12 is a schematic view showing the relationship between the link plates of a chain and the lower bars of a set of friction plates in a conventional drive belt in accordance with the prior art, where the radius of curvature of the inner peripheral surfaces of the link plates is equal to the radius of curvature of the lower bars.
Figure 13:
FIG. 13 is an elevational view showing the forces exerted on one of the friction plates of which is in direct driving relationship with one of the chains, under the condition depicted in FIG. 12.
Figure 14:
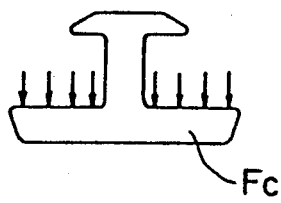
FIG. 14 is an elevational view showing the forces exerted on one of the friction plates which is not in direct driving relationship with one of the chains, under the condition depicted in FIG. 12.

FIG. 12 illustrates the case in which the radius of curvature R of the inner peripheral surfaces of link plates L1 and L2 is equal to the taking-up radius R' of the lower bars of friction plates Fa, Fb, and Fc as the friction plates are wound around a V-type pulley. When R=R', the upper surfaces of the lower bars of friction plates Fa and Fb located on the side where the friction plates do not engage the notches of the link plates, are subjected to pressure, exerted by the inner peripheral surfaces of link plates L1 and L2, in the direction of the arrows shown in FIG. 13. The upper surfaces of the right and left parts of the lower bars of friction plate Fc are subjected to pressure, exerted by the inner peripheral surfaces of link plates L1 and L2, in the direction of the arrows shown in FIG. 14. Therefore, the tapered surfaces F of the lower bars friction plates Fa and Fb, and the tapered surfaces F' of the lower bars of friction plates and Fc can all pressed against the conical surfaces of the V-shaped pulleys so that all of the friction plates share the forces exerted between the belt and the pulleys.

Figure 15:
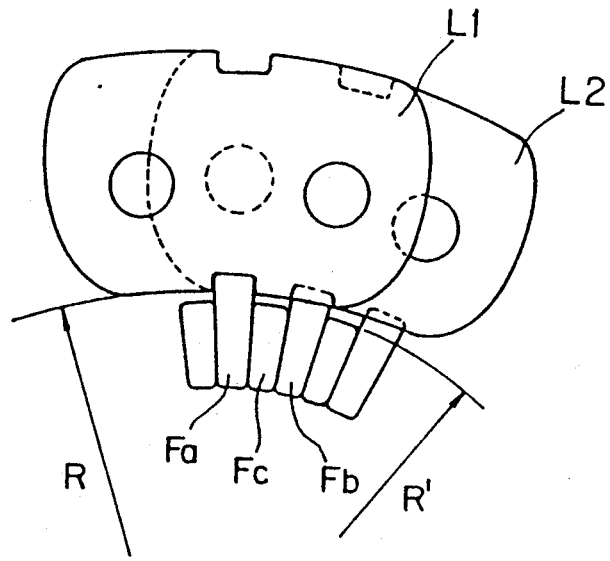
FIG. 15 is a schematic view showing the relationship between the link plates of a chain and the lower bars of a set of friction plates in a conventional drive belt, where the radius of curvature of the inner peripheral surfaces of the link plates is greater than the radius of curvature of the lower bars.
Figure 16:
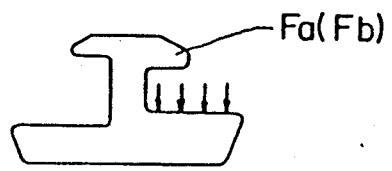
FIG. 16 is an elevational view showing the forces exerted on one of the friction plates of which is in direct driving relationship with one of the chains, under the condition depicted in FIG. 15.
Figure 17:
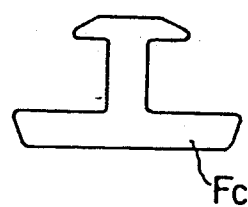
FIG. 17 is an elevational view showing the absence of forces exerted on the friction plates which are not in direct driving relationship with one of the chains, under the ,condition depicted in FIG. 15.

On the other hand, under certain conditions, the radius of curvature R of the inner peripheral surfaces of link plates L1 and L2 is greater than the taking-up radius R' of the lower bars of friction plates Fa, Fb, and Fc, as shown in FIG. 15. That is, $R>R'$. The upper surfaces of the lower bars of the friction plates Fa and Fb located on the sides where the friction plates Fa and Fb are engage with notches of the link plates, are subjected to pressure exerted by the link plates in the direction of the arrows shown in FIG. 16. However, as shown in FIG. 17, the upper surfaces of the right and left portions of the bars of friction plates Fc are not subjected to pressure exerted by the link plates.

Figure 18:
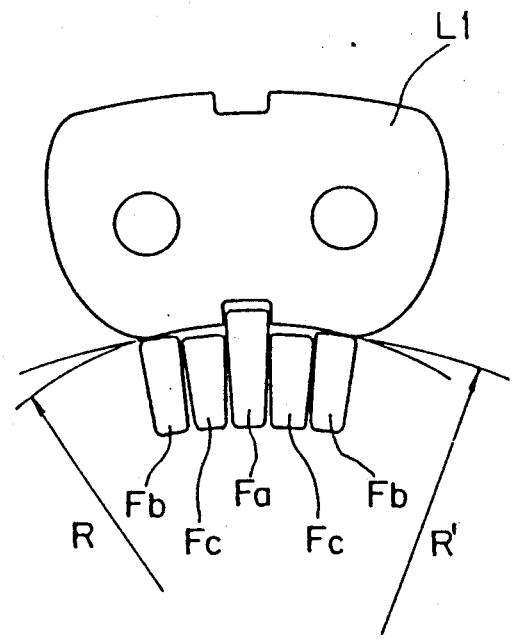
FIG. 18 is a schematic view showing the relationship between the link plates of a chain and the lower bars of a set of friction plates in a conventional drive belt, where the radius of curvature of the inner peripheral surfaces of the link plates is less than the radius of curvature of the lower bars.
Figure 19:
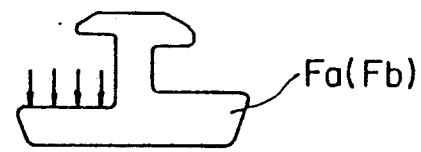
FIG. 19 is an elevational view showing the forces exerted on one of the friction plates of which is in direct driving relationship with one of the chains, under the condition depicted in FIG. 18.
Figure 20:
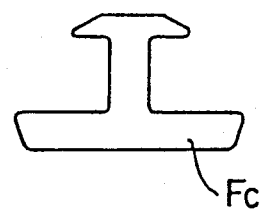
FIG. 20 is an elevational view showing the absence of forces exerted on the friction plates which are not in direct driving relationship with one of the chains, under the condition depicted in FIG. 18.

Under other conditions, the radius of curvature R of the inner peripheral surfaces of link plates L1 and L2 will be less than the taking-up radius R' of the lower bars of friction plates Fa, Fb, and Fc, as shown in FIG. 18. That is, $R<R'$. The upper surfaces of the lower bars of the friction plates Fa and Fb, located at the side where friction plates Fa and Fb are not engaged with notches of the link plates, are subjected to pressure exerted by the link plates, as shown in FIG. 19. Here also, as illustrated in FIG. 20, the upper surfaces of the right and left parts of the lower bars of friction plates Fc are not subjected at all to the pressure exerted by the link plates.

In short, all of the friction plate share the forces applied by the link plates only when the radius of curvature R of the inner peripheral surfaces of the link plates L1 and L2 is equal to the taking-up radius R' of the lower bars of the friction plates, i.e. R=R' However, when R is either greater or less than R', i.e. where $$R \neq R'$$

friction plates Fc do not share the forces exerted by chains C1 and C2. Therefore, friction plates Fa and Fb must share larger forces, and friction surface pressures also increase. As a result, pressure fatigue is induced.

The present invention eliminates the friction plate Fc, which is not in direct driving relationship with the chains. It allows the widths of friction plates Fa and Fb to be increased. The widened friction plates sustain the forces transmitted through the inner peripheral surfaces of the link plates as the pulleys rotate. This makes it possible to reduce the pressure on the friction surface while allowing the frictional force to be increased.

Figure 2:
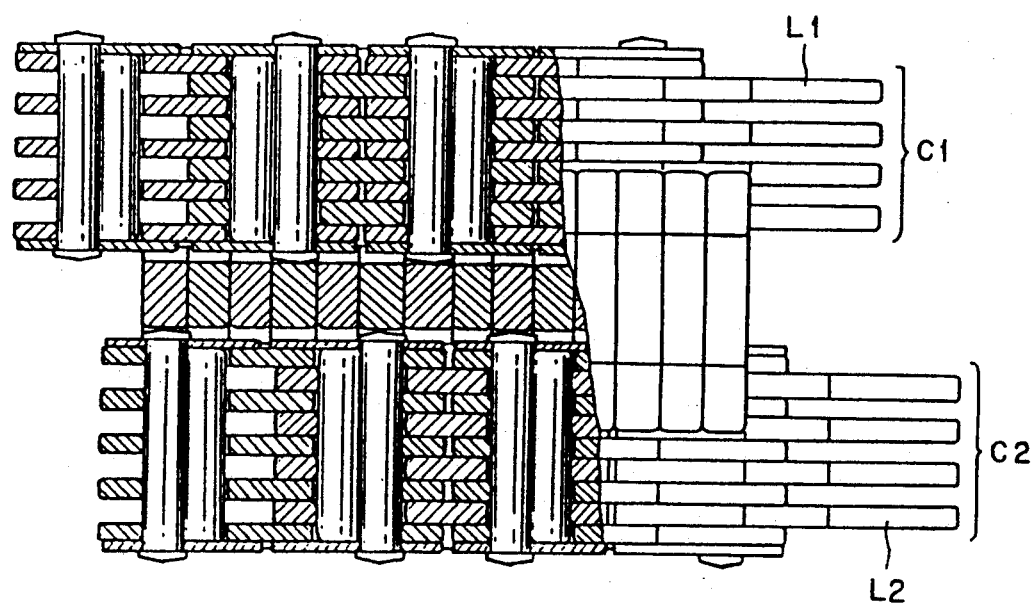
FIG. 2 is a top plan view, partly in section, of the drive belt.

As shown in FIG. 2, as in the case of the prior art, the drive belt of the invention comprises two chains, C1 and C2, which are disposed side-by-side in a right and a left recesses of I-shaped friction plates. Each chain comprises interleaved link plates, and the chains are disposed so that they are out of phase with each other by one half of the pitch distance.

Figure 1:
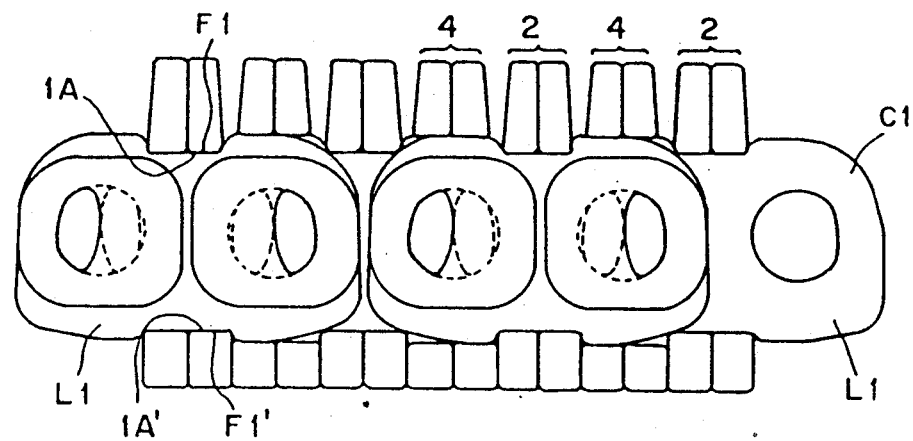
FIG. 1 is a rear elevation of a portion of a friction drive belt in accordance with the invention, showing the drive belt upside-down.
Figure 4:
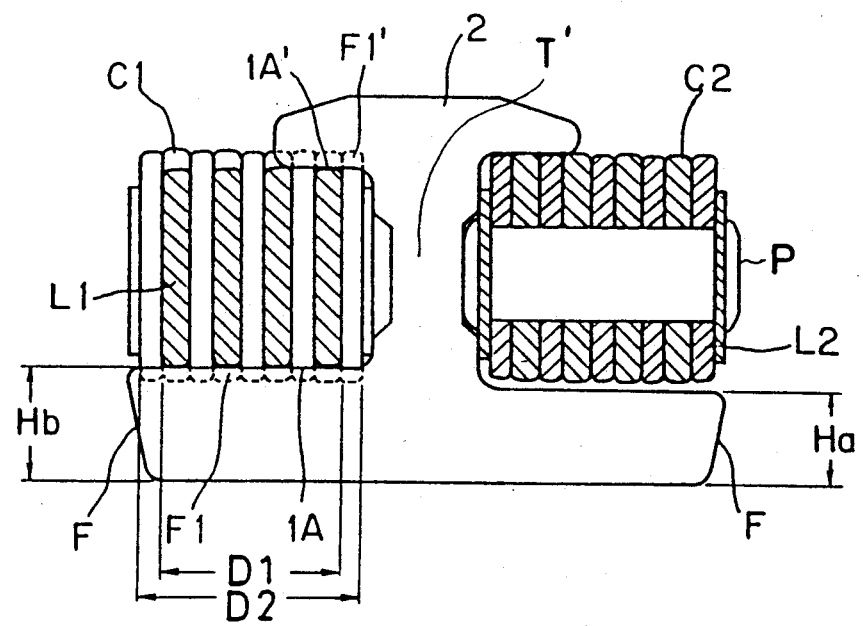
FIG. 4 is a transverse cross-section through the drive belt.

FIG. 1, which is an upside down rear view showing chain C1, illustrates that central portions of the inner peripheral surfaces of link plates L1 of chain C1 are formed with cutout notches 1A, and central portions of the outer peripheral surfaces of link plates L1 are formed with cutout notches 1A'. In FIG. 4, an upper surface of the left portion of the lower bar and a lower surface of the left portion of the upper bar of two overlapping friction plates 2 are engaged with notches 1A and 1A' respectively.

Figure 3:
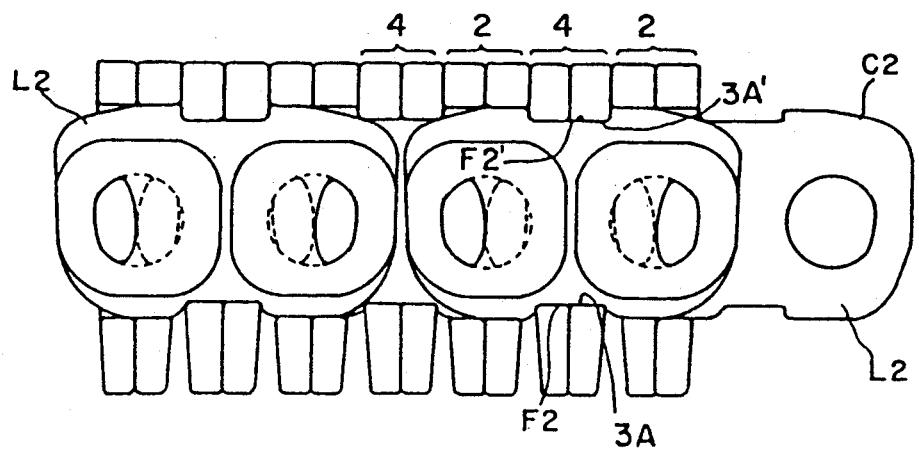
FIG. 3 is a front elevation of the drive belt.

FIG. 3, which is a upright front view showing chain C2. Central portions of the inner peripheral surfaces of link plates L2 of chain C2, are formed with cutout notches 3A, and central portions of the outer peripheral surfaces of link plates L2 are formed with cutout notches 3A'. An upper surface of the right portion of the lower bar and a lower surface of the right portion of the upper bar of two overlapped friction plates 4 are engaged with the cutouts 3A, 3A', respectively.

As shown in FIG. 4, the lower surfaces of the right portions of the upper bars of friction plates 2, and the upper surfaces of the right portions of the lower bar of friction plates 2, do not engage with notches of right-hand chain C2. Similarly, the lower surfaces of the left portions of the upper bars of friction plates 4, and the upper surfaces of the left portions of the lower bars of plates 4, do not engage with notches of left-hand chain C1.

As will be apparent from FIGS. 2, 3 and 4, friction plates 2 and 4 have similar configurations, but are arranged in alternating pairs, with plates 2 having their narrower recesses facing left and their wider recesses facing right, and with plates 4 having their narrower recesses facing right and their wider recesses facing left. There are no interposed friction plates which do not engage with notches of a link plate of one of chains C1 and C2. Each pair of adjacent friction plates 2 can, of course, be thought of as a single friction plate comprising two layers.

Figure 5:
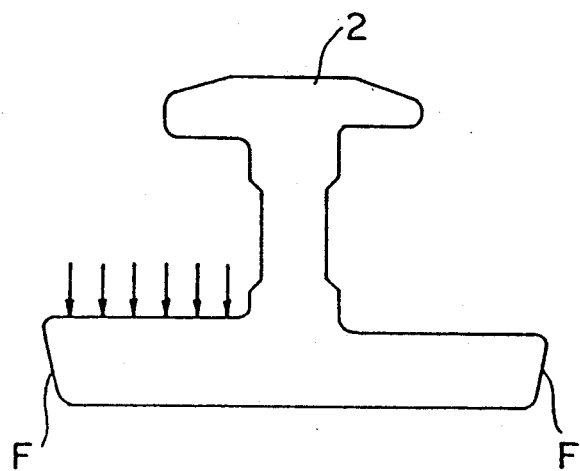
FIG. 5 is an elevational view of a friction plate of the drive belt, showing how forces are applied to the friction plate when the radius of curvature of the inner peripheral surfaces of the link plates of the chains is greater than the radius of curvature of the lower bars of the friction plates.
Figure 6:
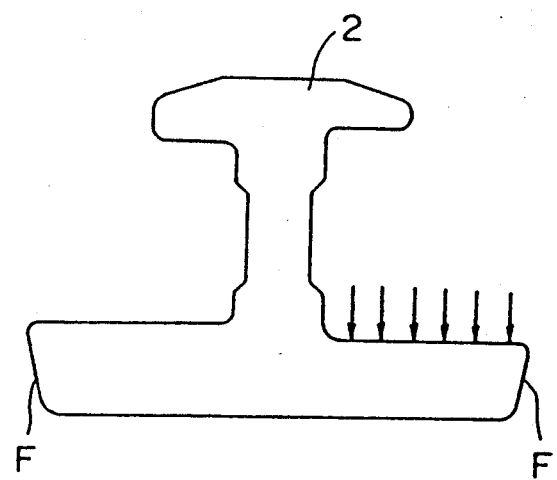
FIG. 6 is an elevational view of a friction plate of the drive belt, showing how forces are applied to the friction plate when the radius of curvature of the inner peripheral surfaces of the link plates of the chains is less than the radius of curvature of the lower bars of the friction plates.

Whether the radius of curvature R of the inner peripheral surfaces of the link plates is greater than, equal to, or less than the radius of curvature R' of the inner bars of the friction plates, the pressure exerted by the link plates as a result of tension in the chains is applied either to the right or to the left upper surfaces of the lower bars of the friction plates 2 as illustrated by the arrows in FIGS. 5 and 6. FIG. 5 shows the case in which $R > R'$, and FIG. 6 shows the case in which $R < R'$. Similar conditions prevail in the case of friction plates 4.

In accordance with the invention, chains having a half pitch base difference are disposed in recesses in the right and left sides of the stacked I-shaped friction plates. One of two adjacent friction plates is engaged with one of the two chains, and the other of the two adjacent friction plates is engaged with the other chain. This alternating relationship proceeds along the length of the drive belt.

With the belt structure of the present invention, the pressure exerted by the link plates as a result of tension in the chains the chains is applied to upper surfaces of the lower bars of all the friction plates, so that both tapered side surfaces of the lower bar of each friction plates are in pressure contact with the friction surfaces of the V-shaped pulleys. The friction force can be substantially uniformly distributed over the friction surfaces of all of the friction plates. Thus, the surface pressure acting on the friction surface can be reduced, while the overall friction between the belt and the pulleys, and thus the overall power transmission capability, can be remarkably increased.

It should also be observed that, with the present invention, the plate thicknesses of the friction plates becomes large in comparison with the thicknesses of the conventional friction plates. Therefore, forming the friction plates from multiple layers is desirable so that they can be made by stamping, using a stamping press. This makes it easy to achieve high accuracy and uniformity in the surfaces of the friction plates.

Referring once again to FIG. 4, it will be observed that each of chains C1 and C2 comprises four link plates of a group of inner link plates, interleaved with five link plates of a group of outer link plates on a connecting pin structure P. In more general terms, there are n inner link plates and n+1 outer link plates.

Accordingly, when both tapered surfaces F of the lower bar of friction plates 2 are engaged under pressure with the V-shaped conical surfaces of pulleys (not shown) to transmit power, the friction force actuating on the right side tapered surface F of the lower bar generates a moment which results in a load, imposed by the upper edges of the left-hand portions of the lower bars of friction plates 2, on a portion of chain C1 consisting of inner links, and having a width D1. The upper edges of the right sides of the lower bars of plates 2 are not engaged with any of the link plates of chain C2.

On the other hand, as will be apparent from FIG. 3, friction plates 4 are engaged with a group of the outer links over a width D2, which is greater than width D1 by twice the width of a link plate. Thus, in the case of friction plates 4, the load is withstood by the outer link plates over a greater width.

Accordingly, the load acting on any given link plate is larger in the case where the load is distributed over width D1 as compared with the case in which the load is distributed over a greater width D2. The greatest load is applied to the inner link plate of chain C1 which is closest to the central columns T' of friction plates 2. Therefore, the rupture strength of the chain depends on the rupture strength of the inner link plates located close to central columns T' of the friction plates. Because the load is concentrated on a particular link plate, the chain is undesirably loaded locally, which results in lowering of the overall power transmission capability of the belt.

One possible way to solve the above problem, would be to use thicker inner link plates close to the central columns of the friction plates. But, this is not practical because it would significantly increase the complexity of the chain and the cost of parts and manpower.

In accordance with the invention, the distinction between inner and outer link plates is eliminated. All the link plates are formed in the same thickness, and the number of link plates in each of the two interleaved groups of link plates on each transverse connecting pin is the same as the number of link plates in the other group. This not only allows the traction load to be uniform along the length of each chain, but also equalizes the widths of the chain structure over which the moments on the various friction plates act. The moment load acting on the friction plates becomes substantially the same at each link plate which shares the moment load.

Figure 22:
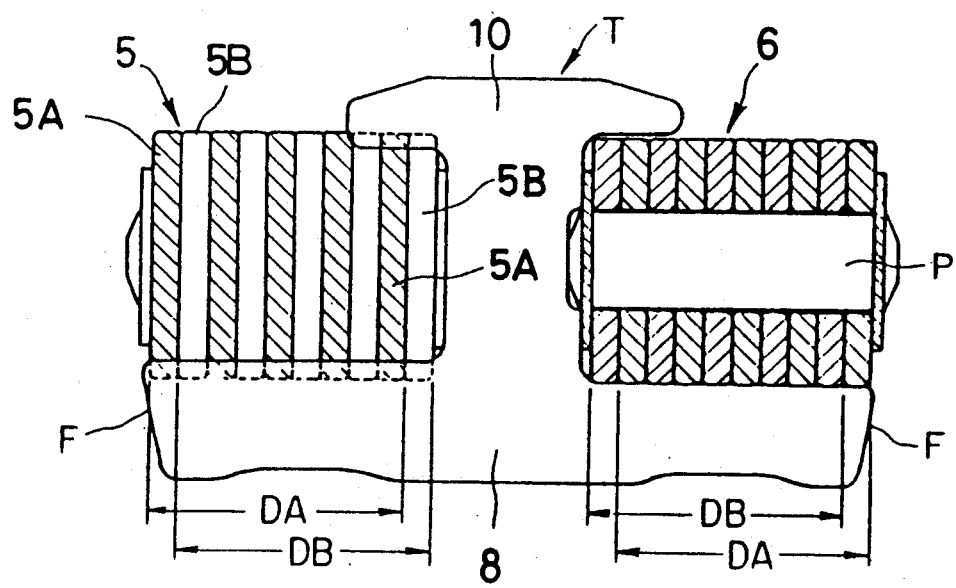
FIG. 22 is a transverse section of the friction drive belt of FIG. 21.

In FIG. 22, endless chains 5 and 6 are disposed one half the pitch distance out of phase with each other in the recesses formed in the right and left sides of friction plates T. Link plates 5A and 5B have the same thickness are interleaved on transverse connecting pin P, there being the same number of link plates IA on pin P as there are link plates IB. In this embodiment, there are provided five link plates 5A and five link plates 5B, all of the same thickness.

Link plates 5A and 5B are similar to those of the belt of FIGS. 1-4 in that the link plates 5A and 5B engage with the upper edge of the left-hand part of lower bar 8 of plate T and certain of them also engage with the lower edge of the left-hand part of the upper bar 10. The right-hand chain 6 has the same function as the left-hand chain 5, although the are longitudinally offset one-half the pitch distance. The group of link plates 5A is engaged with the upper edge of the left-hand part of bar 8 over a width DA, and the group of link plates 5B is similarly engaged with the upper edge of the left-hand part of bar 8 over a width DB, which is the same as width DA. Accordingly, the load acting on the friction plate in the longitudinal direction of the chain becomes substantially the same at each link plate which shares the moment load.

Figure 21:
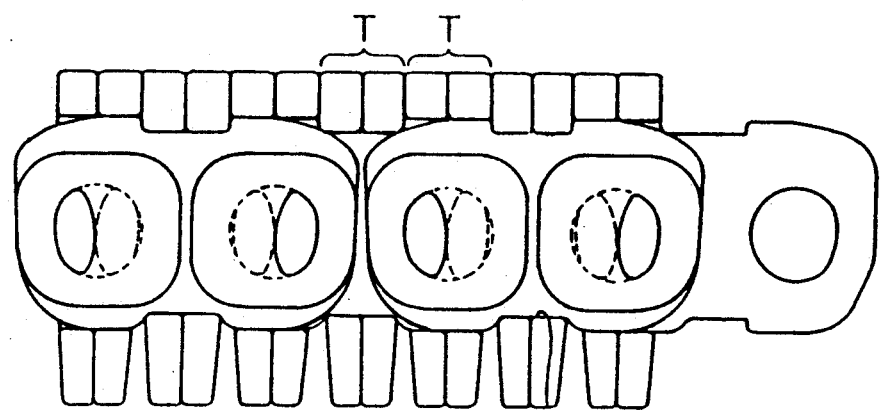
FIG. 21 is an elevational view of a portion of a friction drive belt in accordance with a second embodiment of the invention in which the each group of link plates interleaved with another group of link plates on a transverse pin structure consists of the same number of plates as the number of plates in the group with which it is interleaved.

A number of remarkable advantages come about by virtue of the fact that the link plates are all of the same width, and the number of link plates 5A is the same as the number of link plates 5B. The load resulting from the moment acting on the friction plates is uniformly distributed over the link plates. In contrast with power transmission belts in which the link plates having different ability for receiving the moment load, the power transmission belt according to the embodiment illustrated in FIGS. 21 and 22 has improved power transmitting capability by reason of the fact that the link plates uniformly share not only the traction force but the moment load as well. Unbalanced conditions in the loading of the chains are prevented. In addition, the power transmission belt according to the embodiment of FIGS. 21 and 22 eliminates excessive localized loading of link plates, thereby making it possible to improve the overall strength of the power transmission.

Various modifications can be made to the invention described. For example, each friction plate can consist of three or more layers. While the invention is particularly applicable to variable speed transmissions utilizing two V-type pulleys with opposed cone-shaped surfaces, with appropriate changes in the configurations of the friction plates, it is possible to take advantage of various aspects of the invention in power transmissions using other forms of pulleys or numbers of pulleys other than two. Numerous other modifications can be made to the invention described herein without departing from the scope of the invention as defined in the following claims.

We claim:

1. An endless belt for use in a variable ratio power transmission in which the belt frictionally engages surfaces of at least one pulley comprising:
   a plurality of friction plates, each friction plate having an I-shaped cross section, said plates being stacked in a series in overlapping relationship with one another to provide a friction plate structure in the form of a closed loop, said friction plate structure having recesses on opposite sides thereof; and
   first and second endless chains situated in side-by-side relationship to each other, located respectively in said recesses, and coupled to said friction plate structure in driving relationship therewith;
   in which each of said first and second chains comprises interleaved links disposed at a uniform pitch distance, the pitch distance for the second chain being the same as the pitch distance for the first chain;
   in which the second chain is disposed out of phase with the first chain by one half said pitch distance;
   in which the first chain is directly engaged with the plates of a first subset of said plates; and
   in which the second chain is directly engaged with the plates of a second subset of said plates, said second subset consisting of all of the plates in said plurality of friction plates other than the plates of said first subset;
   whereby all of said plates are directly engaged with said endless chains.

2. An endless belt in accordance with claim 1 in which each of said friction plates is constituted by a plurality of separable layers in face-to-face relationship.

3. An endless belt for use in a variable ratio power transmission comprising:
   a plurality of friction plates, each friction plate having an I-shaped cross section, said plates being stacked in a series in overlapping relationship with one another to provide a friction plate structure in the form of a closed loop, said friction plate structure having recesses on opposite sides thereof; and
   first and second endless chains situated in side-by-side relationship to each other, located respectively in said recesses, and coupled to said friction plate structure in driving relationship therewith;
   in which each of said first and second chains comprises transverse pin means and, on each transverse pin means, first and second groups of link plates interleaved with each other, the first group being disposed longitudinally ahead of the second group by a pitch distance;
   in which the pitch distance for each pair of interleaved groups of link plates in each of the first and second chains is uniform, and the pitch distance for the second chain is the same as the pitch distance for the first chain;
   in which the second chain is disposed out of phase with the first chain by one half said pitch distance;
   in which, in each of said chains, all of the link plates are of the same plate thickness; and in which each of the first and second groups of link plates on each transverse pin means of each of the first and second chains consists of the same number of link plates as the number of link plates with which it is interleaved.

* * * * *

UNITED STATES PATENT AND TRADEMARK OFFICE
CERTIFICATE OF CORRECTION

PATENT NO.   :   5,215,505
DATED        :   June 1, 1993
INVENTOR(S)  :   Sugimoto et al.

It is certified that error appears in the above-identified patent and that said Letters Patent is hereby corrected as shown below:

Column 2, line 32 after "provide a" insert --belt structure for a power transmission in which one or--.

Column 8, line 13, "actuating" should be --acting--.

Signed and Sealed this

Twenty-sixth Day of April, 1994

Attest:

BRUCE LEHMAN

Attesting Officer  Commissioner of Patents and Trademarks